United States Patent
Martín Hernández

(10) Patent No.: US 7,669,800 B2
(45) Date of Patent: *Mar. 2, 2010

(54) REINFORCED COVER FOR GAPS IN AN AERODYNAMIC CONTOUR

(75) Inventor: Agustín Mariano Martín Hernández, Madrid (ES)

(73) Assignee: Airbus Espana, S.L., Madrid (ES)

( * ) Notice: Subject to any disclaimer, the term of this patent is extended or adjusted under 35 U.S.C. 154(b) by 0 days.

This patent is subject to a terminal disclaimer.

(21) Appl. No.: 11/825,661

(22) Filed: Jul. 5, 2007

(65) Prior Publication Data

US 2008/0121758 A1    May 29, 2008

Related U.S. Application Data

(63) Continuation of application No. 11/323,086, filed on Dec. 30, 2005, now abandoned.

(30) Foreign Application Priority Data

Dec. 31, 2004   (ES) ................................ 200403163

(51) Int. Cl.
*B64C 1/38*  (2006.01)
*B64C 3/58*  (2006.01)

(52) U.S. Cl. ....................... 244/130; 244/213

(58) Field of Classification Search ....................... None
See application file for complete search history.

(56) References Cited

U.S. PATENT DOCUMENTS

| 1,659,771 | A | * | 2/1928 | Fox | 418/190 |
|---|---|---|---|---|---|
| 2,166,292 | A | * | 7/1939 | Hall | 244/212 |
| 2,334,975 | A | * | 11/1943 | Williams | 244/216 |
| 2,407,401 | A | * | 9/1946 | Clauser et al. | 244/216 |
| 2,654,685 | A | * | 10/1953 | Voelker | 52/208 |
| 2,915,948 | A | * | 12/1959 | Fehring | 89/37.16 |
| 2,950,083 | A | * | 8/1960 | Compton et al. | 416/230 |
| 3,054,484 | A | * | 9/1962 | Griffiths et al. | 403/317 |
| 3,184,186 | A | * | 5/1965 | Minoru et al. | 244/213 |
| 3,292,330 | A | * | 12/1966 | Tennison | 52/396.09 |
| 3,349,157 | A | * | 10/1967 | Parsons | 264/255 |
| 3,420,570 | A | * | 1/1969 | Kunz | 296/100.06 |

(Continued)

FOREIGN PATENT DOCUMENTS

DE    2216710    10/1973

(Continued)

*Primary Examiner*—Michael R Mansen
*Assistant Examiner*—Joseph W Sanderson
(74) *Attorney, Agent, or Firm*—Klauber & Jackson L.L.C.

(57) ABSTRACT

Reinforced cover for gaps in an aerodynamic contour of a vehicle, with a first attachment section 1*a* attachable to a structural element 2, 5 of the vehicle 11, on a first axial plane I; a second elastic section 1*c* which covers a gap 3 which is located between a fixed part 5 and a moving part 6, 12 of the vehicle 11, and provided with a low-friction coating 8 on its inner surface 1*e*, an outer surface 1*k* with a fiberglass layer 7*a*; a main internal body 9 of an elastic material, a flexible transition section 1*g* between the first and the second section, 1*a*, 1*c*; the outer surface 1*k* of the second section 1*c* flushing with the outer surface 5*a* and extending towards the free end 1*d* as a continuation of the outer surface 5*a* of the fixed part 5.

22 Claims, 4 Drawing Sheets

U.S. PATENT DOCUMENTS

| | | | | |
|---|---|---|---|---|
| 3,478,988 | A * | 11/1969 | Roed | 244/211 |
| 3,897,970 | A * | 8/1975 | Gattenby | 296/166 |
| 4,120,470 | A * | 10/1978 | Whitener | 244/213 |
| 4,131,252 | A * | 12/1978 | Dean et al. | 244/212 |
| 4,212,440 | A * | 7/1980 | Ferris | 244/1 R |
| 4,213,587 | A * | 7/1980 | Roeseler et al. | 244/213 |
| 4,344,995 | A * | 8/1982 | Hammer | 428/61 |
| 4,784,355 | A * | 11/1988 | Brine | 244/213 |
| 4,995,575 | A * | 2/1991 | Stephenson | 244/216 |
| 5,031,836 | A * | 7/1991 | Ward | 239/265.19 |
| 5,065,960 | A * | 11/1991 | Castellucci | 244/131 |
| 5,106,037 | A * | 4/1992 | Sherrill | 244/132 |
| 5,222,692 | A | 6/1993 | Glowacki | |
| 5,372,336 | A * | 12/1994 | Paez | 244/49 |
| 5,516,185 | A * | 5/1996 | O'Donnell et al. | 296/166 |
| 5,622,336 | A * | 4/1997 | Chavanne et al. | 244/129.1 |
| 5,695,154 | A * | 12/1997 | Castellucci et al. | 244/130 |
| 5,735,485 | A * | 4/1998 | Ciprian et al. | 244/113 |
| 6,447,050 | B1 * | 9/2002 | Plassmeyer et al. | 296/180.5 |
| 6,485,093 | B2 * | 11/2002 | Reivers | 296/217 |
| 6,729,583 | B2 * | 5/2004 | Milliere | 244/213 |
| 6,877,695 | B2 * | 4/2005 | Eveker et al. | 244/129.5 |
| 6,981,676 | B2 * | 1/2006 | Milliere | 244/213 |
| 7,118,070 | B2 * | 10/2006 | Abrams et al. | 244/129.3 |
| 2005/0230565 | A1 * | 10/2005 | Kallinen | 244/217 |
| 2005/0242243 | A1 * | 11/2005 | Seve | 244/213 |
| 2006/0006286 | A1 * | 1/2006 | Eveker et al. | 244/129.5 |

FOREIGN PATENT DOCUMENTS

| | | |
|---|---|---|
| ES | 2126226 | 3/1999 |
| ES | 2215274 | 10/2004 |
| GB | 2 323 576 A | 3/1997 |

* cited by examiner

REINFORCED COVER FOR GAPS IN AN AERODYNAMIC CONTOUR

CROSS REFERENCE TO RELATED APPLICATIONS

The present application is a Continuation of non-Provisional Application Ser. No. 11/323,086 filed Dec. 30, 2005, now abandoned which in turn, claims priority from Spanish Application Serial No. 200403163, filed Dec. 31, 2004. Applicants claim the benefit of 35 U.S.C. § 120 as to the non-Provisional Application and priority under 35 U.S.C. § 119 as to the said United States application, and the entire disclosures of both applications are incorporated herein by reference in their entireties.

RELATED APPLICATION

The present application claims priority from Spanish Application Serial No. 200403163, filed on Dec. 31, 2004. Applicants claim priority under 35 U.S.C. §119 as to said Spanish application, the entire disclosure of which is incorporated herein by reference in its entirety.

TECHNICAL FIELD OF THE INVENTION

The present invention pertains to the field of the covers used for covering gaps which have an effect on the aerodynamic properties of outer surfaces of vehicles such as aircraft and high-speed trains. This invention is particularly encompassed within the sector of the covers used for covering gaps located between the surface of a moving element and the surface of a fixed element of such a vehicle.

PRIOR ART TO THE INVENTION

On high-speed vehicles such as aircraft and high-speed trains, there are moving elements, such as may be, for example, on aircraft, the elevators and rudders or flaps, which are articulated to fixed elements, between which there are gaps affecting the aerodynamic contour. The sealing of these gaps, which may have large extensions, is necessary for the purpose of reducing the structural or parasitic drag of the vehicle and so as not to affect the aerodynamic efficiency of the surface, given that the dimensions of such gaps may generate unanticipated behaviors in the flow of air circulating around the vehicle. This problem is especially important for aircraft.

The typical movement of the surfaces of the moving elements is usually that of rotating about a fixed axis.

Inside the openings in the interior of the gaps formed between such fixed and moving elements, vortices are usually generated which are responsible for increasing the structural or parasitic drag, as a result of which the sealing thereof must be aimed at reducing the existing gap to the maximum. As the internal (non-aerodynamic) elements are exposed the air current may become deflected, this giving rise to the aforementioned unanticipated behaviors in the air flow. In addition thereto, when there are gaps of this type in two parts of the structure separated from each other which are connected to each other, a flow of air is generated in the interior of the structure which, at the outlet opening, may cause flow separations, thus reducing the aerodynamic efficiency, it therefore being necessary for the sealing of such gaps to cover the largest part possible thereof in order to create an effective barrier which will restrain or even block this flow of air.

To overcome the aerodynamic problems caused by spaces and gaps located between moving elements and fixed elements, different types of covers, also known as seals, have been conceived.

A first type of such seals, are non-reinforced tongue-shaped seals, covered with low-friction polyester fabric. Although these seals are capable of withstanding major deflections, their lack of reinforcement may lead, under certain conditions, such as, for example, at high cruising speeds, to a flapping of the tongue being caused, thus reducing its efficiency and possibly having a negative effect on the aerodynamics. In addition thereto, in the movements in which the friction against the moving surface tends to contract the seal, blockages may occur, especially if there are grime build-ups.

A second type of seal is a tongue-shaped seal with internal cloth reinforcement, covered with low-friction polyester fabric, which, although it improves the negative aspects of the non-reinforced tongue-shaped seals, entails the drawback of the reinforcement provided by the cloth not being sufficient to reduce the aforementioned flapping to the desired levels.

A third type of seal is a tongue-shaped seal with integrated plastic or metal reinforcement, covered by low-friction fabric, which, although having a suitable rigidity, needs an auxiliary structure for supporting the seal, as a result of which, although positively solving the aerodynamic problems, it is of an unacceptable structural weight.

It was therefore desirable to develop a cover which would provide for an effective sealing of the spaces and gaps of the above-mentioned type, which would reduce the structural or parasite drag to the maximum degree and would prevent unanticipated behaviors of the airflow, with a controllable rigidity in order to withstand the major deflections without undergoing any flapping, attached to the adjacent structure integrated into the cover, which would stand out beyond the aerodynamic contour to a minimum degree, would be highly resistant to weathering and would provide a good degree of aesthetic finishing, given that it would have to be visible from the outside.

DESCRIPTION OF THE INVENTION

It is an object of the present invention to overcome the drawbacks of prior art stated hereinabove by means of a reinforced cover for gaps in the aerodynamic contour of a vehicle, particularly for an aircraft, which comprises a first attachment section attachable to a structural element of the vehicle by attachment means, a second elastic tongue-shaped section with an extension which covers at least partially an existing gap between two parts of the outer surface of a vehicle, such as, for example, a fixed part and a moving part of the vehicle, and with a free end which ends on the outer surface of the moving part, reinforcement means, and a layer of low sliding friction, such as, for example, a layer of polyester fabric, which covers at least partially the inner surface of the second section, a main internal body of an elastic material, such as, for example, silicone rubber, in which cover the reinforcement means comprises at least one fiberglass layer formed at the outer surface of the first section, and in at least an area adjacent to the first section of the outer surface of the second section;

the first section extends in a first axial plane, and the second section extends in a second axial plane, the first axial plane being different from the second axial plane; and the area adjacent to the second section comprises a transition section which joins the first section to the second section.

According to the invention, the thickness of the fiberglass layer may be variable in terms of the stresses to which the first and the second sections are exposed.

The areas which require maximum reinforcement are usually the first section and the adjacent section, given that, on one hand, the first section corresponds to the attachment area, in other words, for attaching the cover to the fixed structural element of the vehicle, whilst the adjacent area which includes the aforementioned transition plane, is the area which includes the bending axis of the second section with regard to the first plane and, therefore, is subjected to continued bending stress. Therefore, the thickness of the fiberglass layer in the second section preferably decreases in direction towards the free end of the second section and, more preferably, the thickness of the fiberglass layer in the aforementioned adjacent area decreases progressively from the transition section towards the free end of the second section. In the other areas of the cover, the fiberglass layer is thinner, which makes it possible to reduce the total weight of the cover, which is especially important in aircraft.

The fiberglass layer forming the reinforcement of the cover of the present invention may be a stratified layer comprised of a plurality of fiberglass cloths that are piled-up and glued together in a manner conventional per se. In those areas in which the reinforcement must be thicker, more cloths being suitably cut to patterns, which determine the size and shape of each one of said cloths, are piled up.

The reinforcement which comprises the fiberglass layer of the cover of the present invention provides substantial advantages over the conventional reinforcements comprised of plastic or metal elements. Thus, first of all, with regard to the process of manufacturing the cover of the present invention, the different thicknesses required in the different areas of the cover and which allow to leave out reinforcement thicknesses in those areas which are not subjected to substantial stresses, are readily achieved by varying the thickness of the fiberglass layer, which contrasts with the need of achieving the different thicknesses by means of molding the plastic reinforcing elements and with the need of achieving the different thicknesses at the metal reinforcements, for example by means of chemical milling.

In addition thereto, the use of fiberglass as a composite reinforcing material enhances, as compared to conventional reinforcements such as carbon fiber, galvanic compatibility of materials thus reducing the possibility of corrosion if mounted on aluminum components which are attacked by carbon fiber. On the other hand, also the galvanic incompatibility which the conventional metal reinforcement elements have against carbon elements which are part of many components of vehicles and particularly of aircraft, is avoided.

Another advantage of the fiberglass being used at the outside of the cover of the present invention is the fact that that outside can be painted, therefore increasing its resistance to weathering and noticeably improving the aesthetic finish of the cover, thus being susceptible of being an element which provides continuity to the paint pattern of the vehicle, whereby the requirements to the selected paint system (primer and finishing coating) are compatibility with fiberglass composite material, suitability to aerodynamic contour (high-solid finish) and a high degree of flexibility in order not to deteriorate with the flexions of the sealing.

In the aforesaid area adjacent to the first section, also the main body may, for the purpose of providing a suitable degree of bending strength, conveniently be of a thickness which increases progressively along the transition section and which decreases in the direction towards the free end of the second section.

In one embodiment of the cover of the present invention, the transition section extends along a slanted longitudinal axis which connects said first axial plane to said second axial plane. The slant of the outer surface of the transition section is not necessarily the same as that of the inner surface of said section. Thus, the slant of the outer surface may be the same as that of a beveled edge of the outer surface of the fixed part of the vehicle, whilst the interior slant may be slanted to a greater degree for the purpose of increasing the thickened area of the main body.

According to the invention, the first section of the cover may be in the shape of an attachment tab, whilst the second section must be of a rectangular configuration.

In accordance with an embodiment of the invention, the edge of the free end of the second section may be provided with a protruding edge which respectively extends from the sides towards the center of the first area. This protruding edge may be a padded rib and it contacts the outer surface of the section to which the cover is not fixed, as for example, the moving part of the vehicle. The protruding edge may have a convexly curved cross-section.

In a preferred embodiment of the invention, the cover comprises a main silicone rubber body and has a first tongue-shaped section and a second section in the form of an integrated tab for attachment to an adjacent structural element. The main body is reinforced at its outer (aerodynamic) side with a fiberglass layer with a high-level surface finish and covered on its inner side (contact with moving part) in a low-friction polyester fabric.

According to one embodiment of the cover of the present invention especially useful for aircraft and, particularly for covering the gaps at the elevators and rudders and at the flaps of the type described hereinabove, the first section which forms the attachment tab is stage-shaped for bolting it to a structural element such as a metal or carbon fiber panel, with a bevel on its inner surface for housing the stage. The rigidity of this tab, achieved with greater thicknesses of the fiberglass layer, allows for it to be easily mechanized, such that interferences are avoided and the integration thereof into the structure is facilitated. Likewise it allows the attachment elements, such as rivetable nuts, to be mounted thereat, so that no additional metal profile as is usually used for preventing rips in the cloth-reinforced seals, is needed for reinforcing the attachment. This alternative is suitable in cases where it is desired to remove the seal without the need of accessing the inside of the structure, as the seal itself retains the nut without any need of using a spanner, which would be necessary for conducting inspections of the assembly of fittings supporting the moving aerodynamic surface. The tab can also take an attachment made directly using conventional bolt, nut and washer.

BRIEF DESCRIPTION OF THE DRAWINGS

In the following some practical embodiments of the elements are described on the basis of some figures in which.

Figure 1:
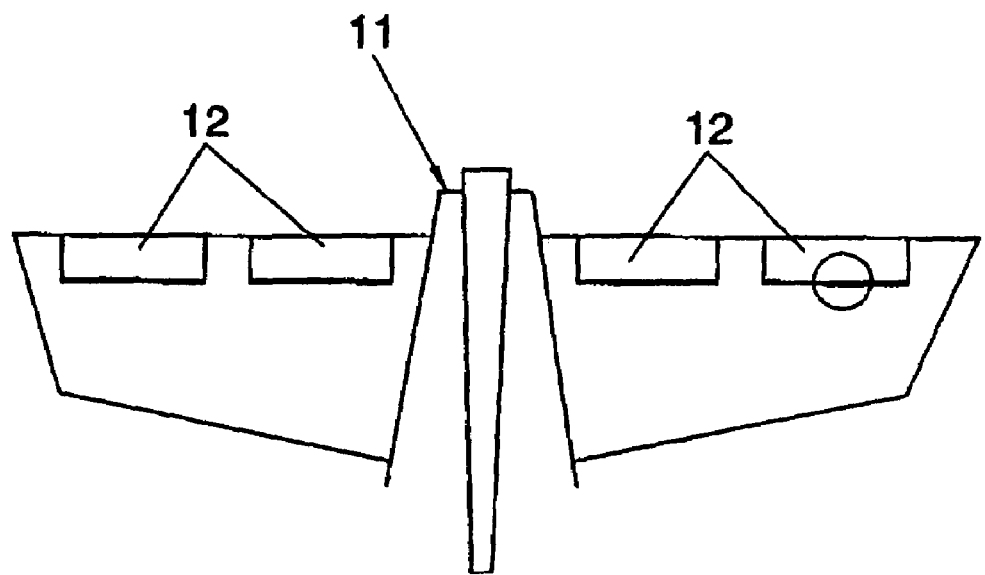
FIG. 1 is a schematic top plan view of the tail section of an aircraft.
Figure 2:
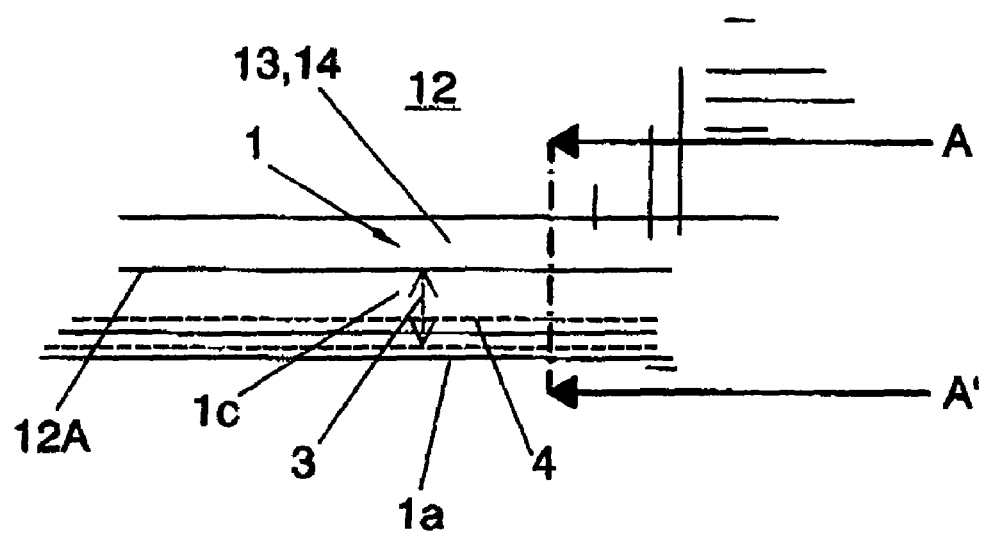
FIG. 2 is a schematic top plan view of the area marked with a circle in FIG. 1.

In these figures there are references identifying the following elements

1 cover
1a first attachment section
1b outer surface of the first section
1c second section
1d free end of the second section
1e inner surface of the second section
1f adjacent area of the second section to the first section
1g transition section
1h inner protruding edge
1i outer surface of the second section
2 structural element of the vehicle
3 gap
4 inside of the moving part
5 fixed part
5a outer surface of the fixed part of the vehicle
6 moving part of the vehicle
6a outer surface of the moving part
7 reinforcement means
7a fiberglass layer
8 low-friction layer
9 main interior body of elastic material
10 attachment means for attaching the first section to the structural element
11 vehicle (aircraft)
12 elevator
12a curved section of the elevator
13 throughhole in the attachment section
I first axial plane
II second axial plane
III longitudinal axis

EMBODIMENT OF THE INVENTION

FIG. 1 shows the tail section of an aircraft where there are located elevators 12 which are articulated to the fixed structure of the aircraft by per se conventional catches. For tilting the elevator 12 with respect to the fixed part of the stabilizer of the aircraft, there is usually a gap 3 between the curved part 12a of the elevator 12 and the surface 5a of the fixed structure 5. This gap 3 is aerodynamically a drawback given that a flow of air may blow into the open space inside the stabilizer through this gap, causing turbulences resulting in greater drag. Likewise, the flow of air entering the inside 4 of the stabilizer through the gap 3 may drag water and foreign objects along with it, which may cause wearing-out and even damage to the elements located in the inside of the stabilizer. The reinforced cover of the present invention can be used for covering these gaps.

Thus, as shown in FIGS. 2 to 6, the cover 1 of the present invention is mounted for covering the gap 3 located between the curved front part 12a of the elevator 12 and the surface 5a of the fixed structure 5, so as to prevent an air current from flowing into the open space 4 between the fixed structure 2 of the stabilizer and the moving structure of the elevator through the gap 3, such that there is no airflow entering towards the inside of the stabilizer.

Figure 3:
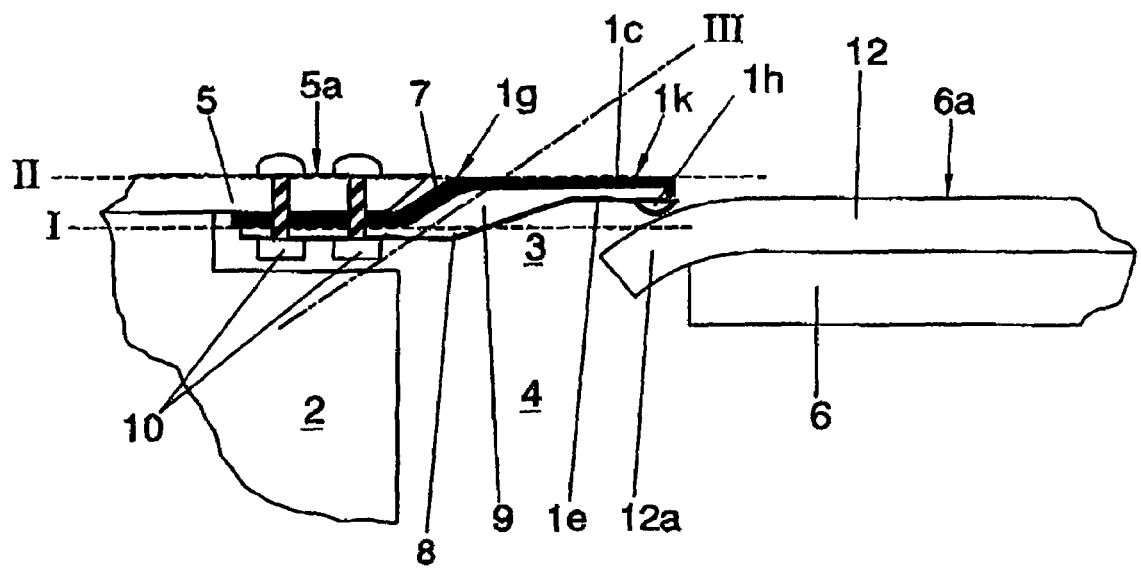
FIG. 3 is a schematic cross-section view along line A-A' shown in FIG. 2.

The cover 1 comprises of a first attachment section 1a shaped in the form of an attachment tab, and a second section 1c which covers the gap by resting on the surface 6a of the elevator 12. As shown in FIG. 3, the cover 1 is joined to the fixed structure of the stabilizer by attachment elements including bolt/washer/nut assemblies 10, which are inserted into throughholes 13 (see FIG. 6) through both the attachment tab 1a and the fixed part 5 which consists of a portion of an exterior panel which is joined, in turn, to a structural element 2 of the stabilizer.

Between the attachment tab 1a and the second section 1c of the cover there is a transition section 1g which allows the tab 1a and the second section 1c to be respectively located in axial planes I and II. The first axial plane I is located at the level of the inner surface of the external panel 5, whilst the second axial plane II is located at the level of the outer surface 5a of the external panel 5. In turn, the transition section 1g extends along a slanted longitudinal axis which extends from said first axial plane I up to said second axial plane II.

By means of this configuration, it is thus possible for the outer surface of the second section 1c to flush with the surface 5a of the panel 5, and for the attachment tab to be anchored to the inner surface of the panel 5.

Figure 4:
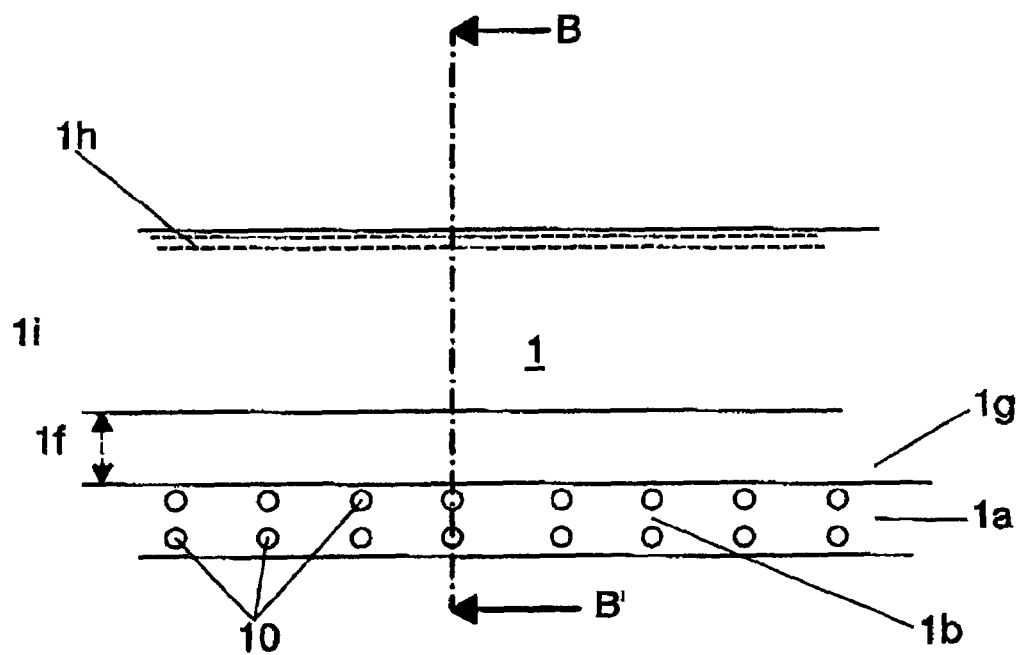
FIG. 4 is a schematic top plan view of an embodiment of the cover of the present invention.
Figure 5:
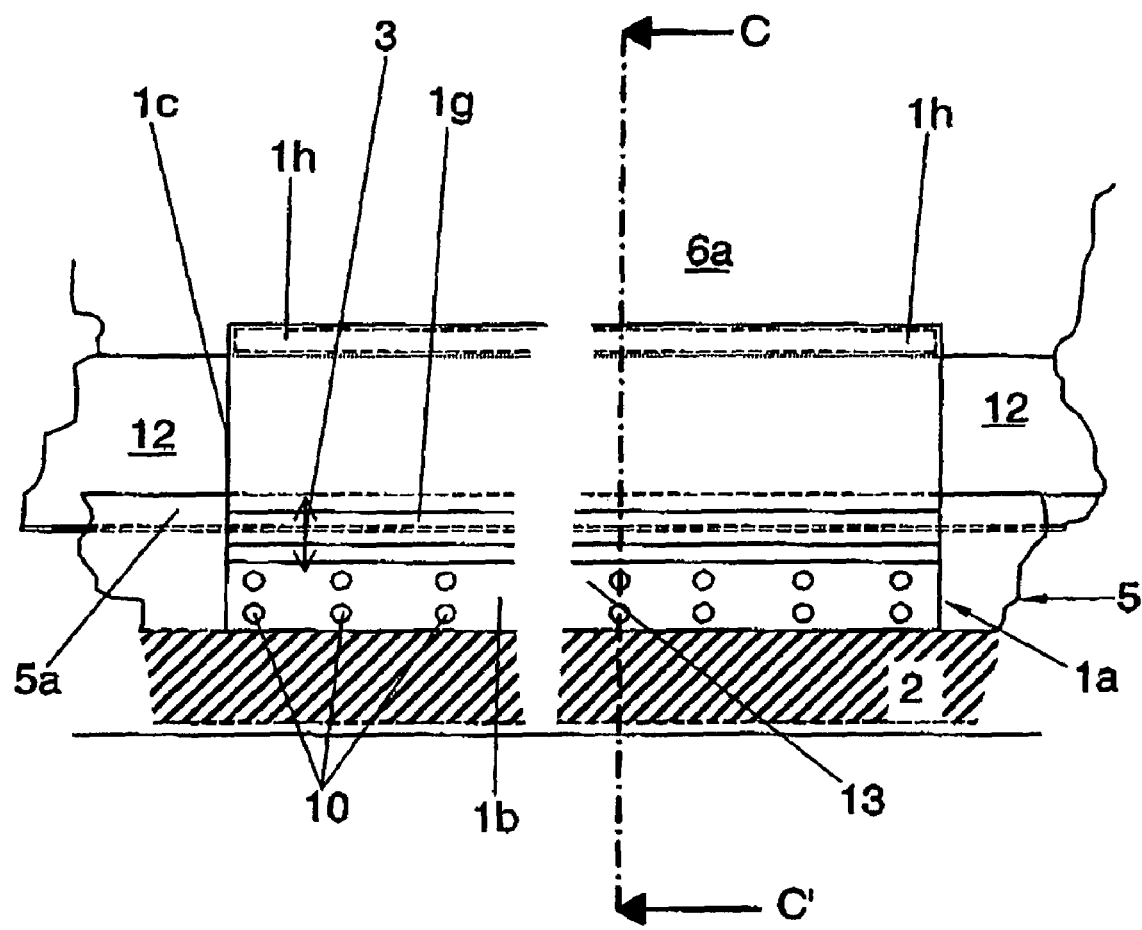
FIG. 5 is a schematic view showing the position of the cover in FIGS. 2 and 4 with greater detail.

As particularly shown in FIG. 4, the second section 1c has a rectangular configuration and extends from the adjacent area 1f up to the free end 1d, where it is provided on its inner surface with a padded protruding edge 1h of a convexly curved cross-section. This edge 1h contacts, as shown in FIG. 3, the outer surface 6a of the curved section 12a of the elevator 12.

Figure 6:
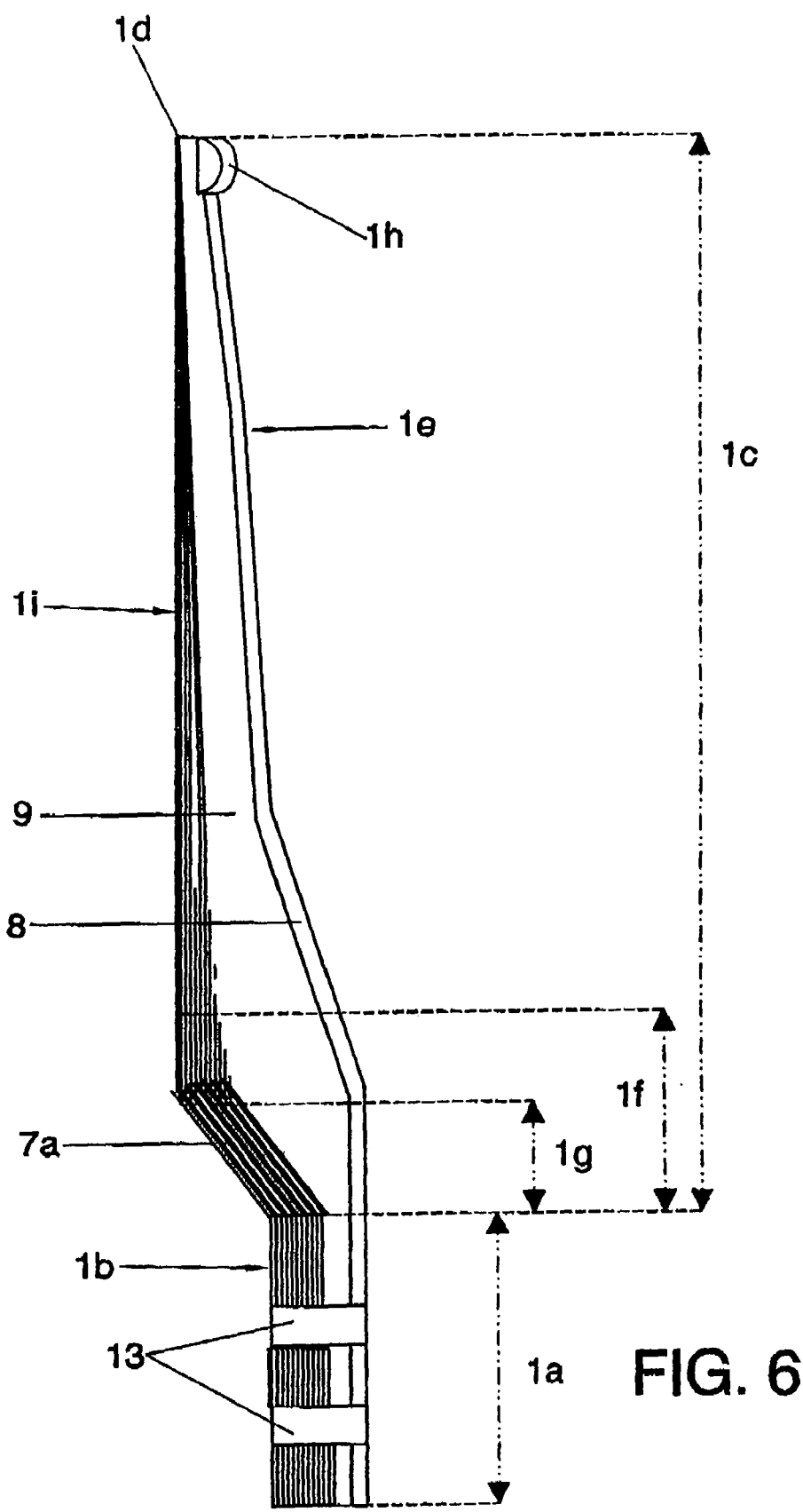
FIG. 6 is a schematic side view along line B-B' shown in FIG. 4.

FIGS. 3 and 6 illustrate that the cover comprises a main body 9 made of silicone rubber, clad on the outside with reinforcement 7, and on the inside with a low-friction layer 8 of polyester fabric. The reinforcement 7 is a fiberglass layer 7a, variable in thickness in terms of the stresses to which the first and the second section 1a, 1c are exposed. These stresses are greater at the first section 1a corresponding to the attachment tab due to that the anchoring points of the attachment means 10 being located there and at the transition section due to that this is where bending stress is caused in view of the fact that the bending axis between the immobilized section comprised of the attachment tab 1a and the free end 1d of the second section 1c is located in the transition section.

Therefore, the thickness of the fiberglass layer 7a in said first section 1a and in said adjacent area 1f of the second section 1c is greater than the thicknesses at the rest of the cover, and progressively decreases from the transition section 1g towards the free end 1d of the second section 1c. In turn, in the adjacent area 1f, the main body 9 is of a thickness which progressively increases along the transition section 1g and decreases in the direction towards the free end 1d of said second section 1c.

The embodiment illustrated in FIG. 6 shows how the cover made of fiberglass 7a which forms the reinforcement is a stratified layer made of a plurality of piled-up and per se conventionally glued-together fiberglass cloths. In those areas in which the reinforcement must be thicker, specifically in the attachment section 1a, the adjacent area 1f and in the transition section 1g, the number of piled-up cloths is greater than in the rest of the reinforcement. Each of these cloths has been suitably cut to a pattern determining their size and shape in order for it to be possible for them to be piled up in the proper area.

For the use for sealing gaps on aircraft elevators, suitable fiberglass cloths for obtaining the fiberglass layer are, for example, continuous filament fiberglass cloths, impregnated with epoxy resin, in accordance with the following specifications which are quoted herein as an example in the following Table:

TABLE 1

| Characteristic | Specifications |
| --- | --- |
| Fiberglass | 100% |
| epoxy resin | E644 |
| Density | 1.4 |
| impregnation rate | 43% |
| Finished cloth | |
| size (cm) | 100 |
| Weight (g/m2) | 290-320 |
| Thickness (mm) | 0.2-0.3 |
| Tensile strength (Mpa) | >30 |
| Bending strength (Mpa) | 50-55 |

On the other hand, the low-friction layer may be made from polyester fabrics which, as an example, may be of specifications such as those specified in the following Table:

TABLE 2

| Characteristic | Specifications |
| --- | --- |
| Type of polyester | LFT with silicone coating |
| Type of weave | Warp fabric |
| Type of filament | Continuous 55/56 decitex |
| Weave | 18 threads chain |
| | 19 threads weft |
| Weight (g/m2) | 200-500 |
| Thickness (mm) | 0.3-0.5 |
| Tensile strength (daN/5 cm) | >45 |
| Ultimate elongation | >65 |
| Breaking strength (bar) | >10 |

In turn, the interior body may be made out of silicone rubber of the characteristics such as those which are specified for purpose of example in the following Table:

TABLE 3

| Characteristic | Specifications |
| --- | --- |
| Hardness | 46-55 |
| Tensile strength | >4 |
| Ultimate elongation (%) | approx. 200 |
| Wind shear strength | approx. 9 |
| Density | approx. 1, 2 |

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

The invention claimed is:

1. Reinforced cover for gaps in an aerodynamic contour of a vehicle, particularly for an aircraft, comprising:
    a first section for securing the cover to an external panel of a structural element of the vehicle by attachment means, the external panel having an inner surface and an outer surface,
    a flexible second section being tongue-shaped and having an extension that at least partially covers a gap between the external panel and a moving part of the vehicle and with a free end which ends on said moving part, the second section having an inner surface and an outer surface,
    reinforcement means, and
    a low-friction layer which at least partially covers the inner surface of said second section,
    the first section being secured on the inner surface of the external panel and the outer surface of the second section flushing with the outer surface of the external panel as a continuation of the outer surface of the external panel;
    the reinforcement means comprising a reinforcement member with at least one fiberglass layer in epoxy resin having a thickness and formed at the outer surface of the first section and at least in one adjacent area to said first section of the outer surface of said second section;
    said reinforcement member in the first section having an under surface and extending substantially in a first axial plane and in the second section extending substantially in a second axial plane, said first axial plane being different from said second axial plane; and
    an elastic member connected to the under surface of the reinforcement member on at least the adjacent area of the second section.

2. Reinforced cover according to claim 1, wherein the fiberglass layer comprises a plurality of piled-up and glued-together fiberglass cloths, the thickness of the fiberglass layer being determined by the number of piled-up fiberglass cloths.

3. Reinforced cover according to claim 2, wherein the fiberglass layer comprises a larger number of piled-up glass cloths in areas of said first and said second section which are exposed to greater stresses, than in areas subjected to lesser stresses.

4. Reinforced cover according to claim 2, wherein the fiberglass layer comprises a larger number of piled-up fiberglass cloths in said first section and in said adjacent area of the second section that in other sections of the cover.

5. Reinforced cover according to claim 2, wherein the number of piled-up fiberglass cloths in the second section decreases in the direction towards the free end of said second section.

6. Reinforced cover according to claim 2, wherein the number of piled-up fiberglass cloths in said adjacent area decreases progressively up to the free end of the second section.

7. Reinforced cover according to claim 1, wherein the thickness of the fiberglass layer is greater at areas of said first and said second section which are exposed to greater stresses, than in areas subjected to lesser stresses.

8. Reinforced cover according to claim 1, wherein the thickness of the fiberglass layer in said first section and in said adjacent area of the second section is greater than the thickness of the fiberglass layer in other sections of the cover.

9. Reinforced cover according to claim 1, wherein the thickness of the fiberglass layer on the second section decreases in the direction towards the free end of said second section.

10. Reinforced cover according to claim 1, wherein the thickness of the fiberglass layer on said adjacent area decreases progressively towards the free end of the second section.

11. Reinforced cover according to claim 1, wherein a transition section extends along a slanted longitudinal axis which extends from said first axial plane to said second axial plane.

12. Reinforced cover according to claim 11, wherein in said adjacent area, the elastic member is of a thickness which progressively increases in said transition section and decreases in the direction towards free end of said second section.

13. Reinforced cover according to claim 1, wherein the free end of the second section has, at least partially, a lower protruding edge which contacts with the outer surface of said moving part of the vehicle.

14. Reinforced cover according to claim 13, wherein the lower protruding edge has a convexly curved cross-section.

15. Reinforced cover according to claim 1, wherein the material of the elastic member is silicone rubber.

16. Reinforced cover according to claim 1, wherein the low-friction layer is made of polyester fabric.

17. Reinforced cover according to claim 1, wherein said first section is shaped in the form of an attachment tab.

18. Reinforced cover according to claim 1, wherein at least the outer surface of said second section is coated with paint.

19. Reinforced cover according to claim 1, wherein the outer surface of the cover is coated with paint.

20. Reinforced cover according to claim 1, wherein the first attachment section comprises at least one through hole for receiving the attachment means.

21. Reinforced cover according to claim 20, wherein the attachment means are selected from rivets, nut-bolt assemblies and bolt-rivetable nut assemblies.

22. Reinforced cover according to claim 1, wherein said adjacent area of the second section comprises a flexible transition section between said first section and said second section, the outer surface of the second section flushes with the outer surface of the external panel of the vehicle and extends towards the free end as a continuation of of the external panel said outer surface.

* * * * *